United States Patent [19]

Tatsuno et al.

[11] Patent Number: 5,268,912
[45] Date of Patent: Dec. 7, 1993

[54] HARMONIC LIGHT SOURCE CAPABLE OF BEING OPTICALLY MODULATED AND OPTICAL INFORMATION PROCESSING APPARATUS EMPLOYING THE SAME

[75] Inventors: Kimio Tatsuno, Kodaira, Japan; Michael McLoughlin, County Donegal, Northern Ireland; Tsuyoshi Toda, Kodaira, Japan

[73] Assignee: Hitachi, Ltd., Tokyo, Japan

[21] Appl. No.: 705,956

[22] Filed: May 28, 1991

[30] Foreign Application Priority Data

May 25, 1990 [JP] Japan ................... 2-133821

[51] Int. Cl.$^5$ .................................. H01S 3/10
[52] U.S. Cl. .................................. 372/22; 372/13; 372/21; 372/26; 358/330
[58] Field of Search .............. 372/13, 10, 20–22, 372/29; 358/330

[56] References Cited

U.S. PATENT DOCUMENTS

| 3,464,027 | 8/1969 | De Maria . | |
|---|---|---|---|
| 3,544,916 | 12/1970 | Angelbeck . | |
| 3,947,780 | 3/1976 | Rice et al. | 372/22 |
| 4,125,860 | 11/1978 | Ishii et al. . | |
| 4,432,613 | 2/1984 | Ueda et al. | 372/13 |
| 4,656,635 | 4/1987 | Baer et al. | 372/27 |
| 4,761,786 | 8/1988 | Baer | 372/13 |
| 4,945,539 | 7/1990 | Bagshaw et al. | 372/13 |
| 4,965,803 | 10/1990 | Esterowitz et al. | 372/13 |
| 4,979,176 | 12/1990 | Young et al. | 372/13 |

FOREIGN PATENT DOCUMENTS

| 1287229 | 1/1969 | Fed. Rep. of Germany . | |
|---|---|---|---|
| 3903586 | 8/1989 | Fed. Rep. of Germany . | |
| 277350 | 3/1990 | Fed. Rep. of Germany . | |
| 1-194376 | 8/1989 | Japan | 372/13 |

OTHER PUBLICATIONS

T. Y. Fan et al., "Nd:MgO:LiNbO$_3$ spectroscopy and laser devices", *J. Opt. Soc. Am. B,* vol. 3, No. 1, Jan. 1986, pp. 140–147.

A. Cordova-Plaza et al., "Miniature CW and Active Internally Q-Switched Nd:MgO:LiNbO$_3$ Lasers", *IEEE J. Quantum Electronics,* vol. QE-23, No. 2, Feb. 1987, pp. 262–266.

S. Wiegand Schütz, "Mit Diodenlasern angeregte Festkörperlaser", In DE-Z.: *Laser und Optoelektronik,* vol. 20, No. 3, Apr. 15, 1988, pp. 39–45.

Optics Letters vol. 13, No. 10, P805-P807 (1988).

Primary Examiner—Léon Scott, Jr.
Attorney, Agent, or Firm—Antonelli, Terry, Stout & Kraus

[57] ABSTRACT

There is disclosed a harmonic light source which comprises: a laser light source for radiating a pumping laser beam; a laser active medium for performing a laser oscillation by receiving the laser beam from said laser light source, a resonator being formed between a reflecting surface and said laser active medium; and a harmonic generating medium provided in said resonator for generating a harmonic, and which serves to modulate the harmonic by applying a supersonic wave to one of said laser active medium and said harmonic generating medium.

22 Claims, 4 Drawing Sheets

HARMONIC LIGHT SOURCE CAPABLE OF BEING OPTICALLY MODULATED AND OPTICAL INFORMATION PROCESSING APPARATUS EMPLOYING THE SAME

BACKGROUND OF THE INVENTION

The present invention relates to a laser light source of which wavelength is shortened using a second harmonic, sum frequency mixing, difference frequency mixing and which is used with a light source for an optical disc, a laser printer and the like.

As a prior art laser light source, for example, as described in an article in Optics Letters, Vol. 13, No. 10, October 1988, pp. 807–809, there is proposed a coherent light source in which a nonlinear optical crystal KTP (potassium titanate phosphate) is used and a second harmonic generation is utilized. In this article, it is reported that a green light with a wavelength of 532 nm is stably obtained as a second harmonic of a YAG laser, which is end-pumped with a semiconductor laser, from the light source.

When such a coherent light source of a short wavelength type which is relatively miniaturized and is readily handled is, for example, utilized as a light source for an optical disc, it is possible to greatly improve a storage density of information. The reason is that, as well known, the storage density of the optical disc increases inversely as the light spot diameter squared and the light spot diameter decreases in proportion to the wavelength of the light.

Moreover, the coherent light source using the second harmonic is also available for a light source for a laser printer. The reason is that by shortening the wavelength, the spot diameter on a photosensitive drum can be made to be small and the resolution of printing can be improved.

SUMMARY OF THE INVENTION

With the prior art described above, however, it is impossible to modulate the second harmonic corresponding to the intensity of an information signal. In other words, in an optical information processing apparatus such as an optical disc or a laser printer, the recording of information, or the printing can be performed until the intensity of a laser beam is modulated with some information in the form of a digital or analog signal. Therefore, in the case where the laser light source itself cannot be directly modulated, it is necessary to provide a modulator of the light intensity utilizing an acoustooptic effect (A/O) or an electrooptic effect (E/O) in the external side. As a result, there arises disadvantages in that such an arrangement leads the optical information processing apparatus to scaling up of the apparatus, complication of the adjustment, and increasing in cost.

Thus, the reason why the laser beam cannot be directly modulated is that an upper level life time of the above-mentioned solid state laser, like Nd:YAG (neodymium: yttrium, aluminium, gallium) laser is long, and therefore, even if the intensity of the laser beam emitted from the pumping semiconductor laser is modulated, the frequency range capable of following the modulation is at most up to 20 KHz, and it is impossible to perform the modulation with a frequency of at least MHz band, preferably more than 20 MHz or so required for the optical disc or laser printer.

It is therefore an object of the present invention to provide a laser light source of short wavelength type which is capable of being modulated. For the purpose of realizing such a laser light source, according to the present invention, the following means are taken.

Now, a ferroelectric crystal or organic crystal having nonlinear optical characteristics is essential to the second harmonic generation, and a fundamental wave is applied to such a crystal so that a second harmonic of the fundamental wave is generated.

On the other hand, such a ferroelectric crystal or organic crystal can generate an electrooptic wave. That is, in the so-called acoustooptic device, a transducer is stuck to the ferroelectric crystal such as $TeO_2$ (tellurium dioxide), or $PbMoO_4$ (lead molybdenum oxide), and an ac voltage of frequency MHz or more is applied thereto, thus generating a supersonic wave. An elastic wave due to such a supersonic wave can be regarded as a grating generated in a crystal. If such a grating is present in a crystal, the incident laser beam is subjected to diffraction, so that the path thereof can be bent. With such a method, it is possible to modulate the intensity of the laser beam which is applied into the crystal.

In short, when the supersonic wave is absent in a crystal, the second harmonic is propagated on an optical axis so that the intensity of light exists on the optical axis. However, when the supersonic wave is present in the crystal, the intensity of light does not exist on the optical axis since the propagating direction of the second harmonic is bent by the diffraction phenomenon of the light. At this time, the bent light will be blocked by a shielding plate.

Moreover, in an electrooptic device, phase matching conditions are broken by applying a suitable voltage to the crystal to generate therein deformation, thus preventing the second harmonic from being generated. As a result, it is possible to modulate the second harmonic.

In the present invention, the method of acoustooptic light modulation or electroptic light modulation as described above is applied to the nonlinear optical crystal itself for generating the second harmonic. That is, if a transducer is mounted to a KTP crystal and a high frequency voltage is applied thereto, a supersonic wave is generated in the KTP crystal. Such a supersonic wave serves to bend the propagating direction of a fundamental wave of an incident laser beam, or the second harmonic. Therefore, if the supersonic wave is switched on or off, or the amplitude of the supersonic wave is varied, it is possible to modulate the intensity of the fundamental wave or its second harmonic.

Moreover, it is also possible to generate a supersonic wave in the solid state laser medium itself such as an Nd:YAG, LNP or Nd:YVO crystal, thus modulating the generated laser beam.

Further, as described above, the intensity of light is modulated by applying the electrooptic effect to the crystal. The electrooptic effect has a superior advantage in that a higher modulation speed can be obtained compared with the case of the acoustooptic effect.

DETAILED DESCRIPTION OF THE PREFERRED EMBODIMENTS

EMBODIMENT 1

Figure 1:
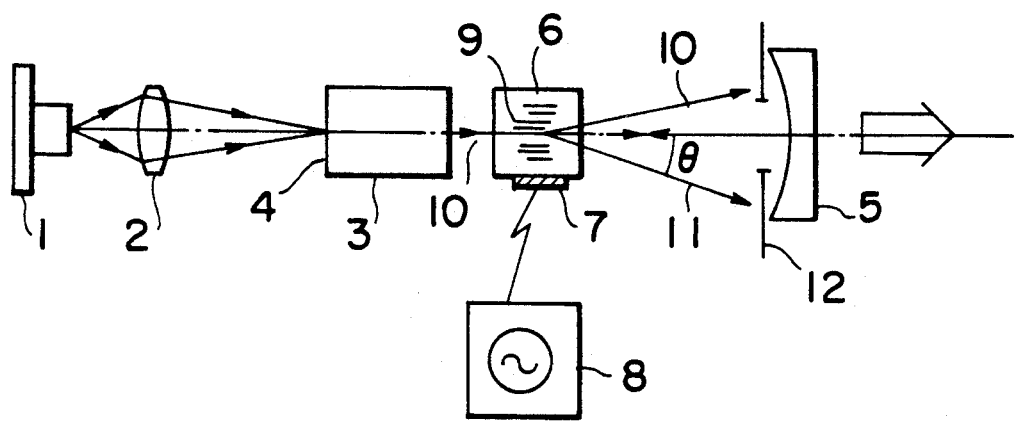
FIG. 1 is a diagram showing the arrangement of one embodiment of the present invention.

A first embodiment of the present invention will hereinafter be described with reference to FIG. 1. A laser beam emitted from a high output semiconductor laser 1 is condensed by a lens 2 to be applied to an end face of an Nd:YAG crystal 3. The beam absorbed in the crystal 3 serves as the so-called pumping light for a YAG laser. A plano-concave resonator is constructed between an end face of incidence 4 and a mirror 5, so that a laser oscillation of wavelength 1064 nm or 946 nm is performed. At this time, an ac voltage 8 is applied to a nonlinear optical crystal 6, such as KTP or $KNbO_3$, which has a transducer 7 mounted thereto and is disposed in the resonator. As a result, a supersonic wave 9 is generated on the nonlinear optical crystal 6 so that an incident light 10 is diffracted, thus bending the propagating direction thereof to a direction 10 or 11. If an aperture stop 12 is disposed at a place towards which the diffracted light propagates, the diffracted light is blocked by the aperture stop 12. As a result, the intensity of light is modulated on an optical axis. Then, an angle of diffraction of light is given by the following expression:

$$2d\sin\theta = m\lambda$$

where m represents an integer, $\lambda$ represents a wavelength of the laser beam, and d represents a wavelength of the supersonic wave. At this time, the nonlinear optical crystal 6 generates a second harmonic or a wavelength changing wave of a higher harmonic, and therefore, it is possible to realize a short wavelength light source which is capable of being modulated.

Moreover, recently, a study of the harmonic generation noting a high nonlinear optical effect of an organic material such as MNA or xanthone has been made on a large scale, so that the bulk-like organic crystal is being obtained gradually. According to the present invention, similarly, the intensity of light can be modulated by generating a supersonic wave on such an organic crystal.

EMBODIMENT 2

Figure 2:
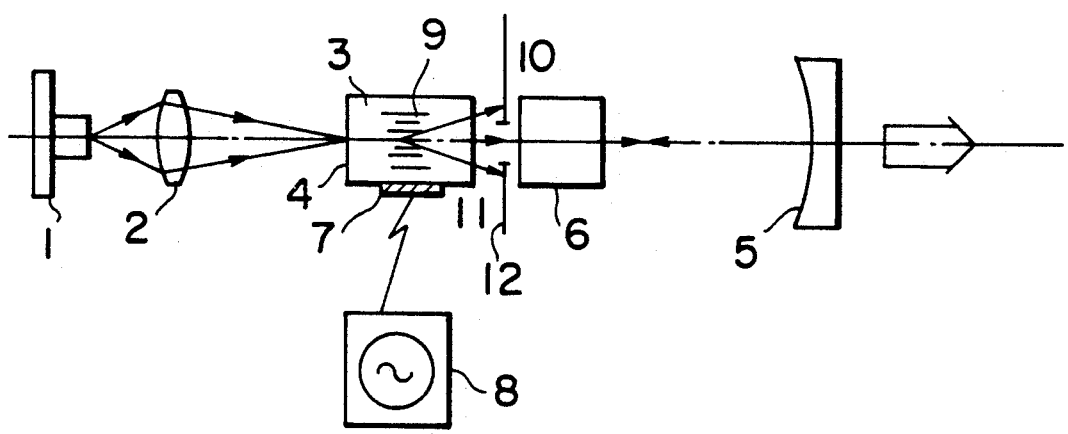
FIG. 2 is a diagram showing the arrangement of another embodiment of the present invention.

FIG. 2 shows a second embodiment of the present invention. The present embodiment is constructed in such a way that the supersonic wave described in the first embodiment is generated in an Nd:YAG crystal itself as a laser oscillation medium. A coherent light emitted from a semiconductor laser 1 is condensed by a lens 2 to be applied to an Nd:YAG crystal 3. A resonator is formed between an end face of incidence 4 of the crystal and a mirror 5, so that a laser beam of wavelength 1064 nm or 946 nm is generated. A harmonic generating device 6 made of a nonlinear optical material such as KTP, $KNbO_3$, or an organic crystal is disposed in the resonator. With such an arrangement, a harmonic of an internal resonator type is generated. At this time, a high frequency voltage 8 is applied to the Nd:YAG crystal 3 having a transducer 7 mounted thereto. Thus, a supersonic wave 9 is generated in the crystal to generate a grating by which the propagating direction of the laser oscillation beam is bent to a direction 10 or 11. Then, only the diffracted light is blocked by an aperture stop 12. With the above arrangement, by switching the supersonic wave in the crystal on or off, it is possible to modulate the intensity of light on the optical axis.

In this regard, it is also possible to let a material, such as Nd:YAB (neodymium : yttrium, aluminium, boron) crystal, which is a laser medium and has therein nonlinear optical characteristics have a supersonic wave optical modulation capability according to the present invention.

EMBODIMENT 3

Figure 3:
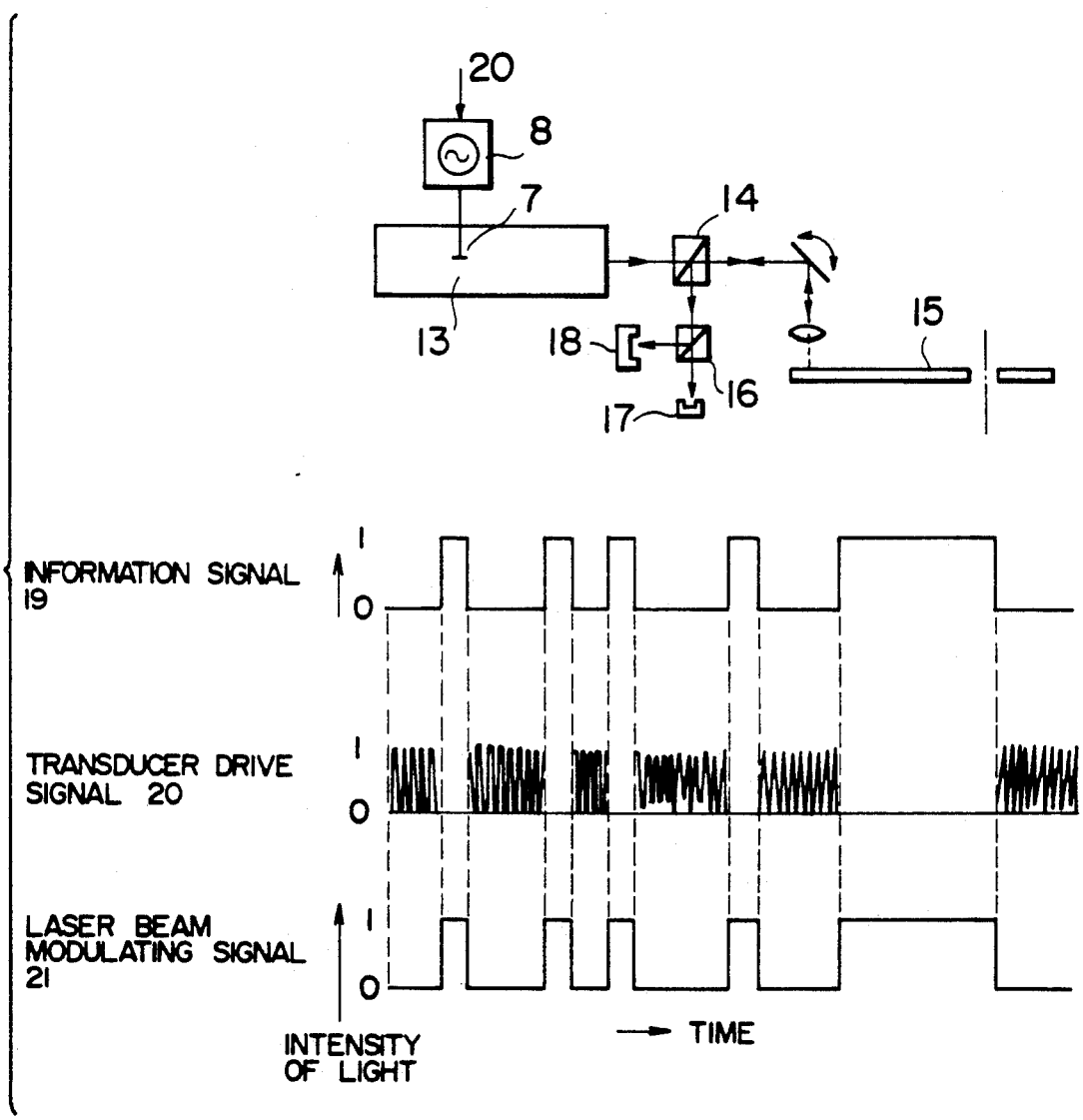
FIG. 3 is a diagram showing the arrangement of an optical disc apparatus using a light source, which is capable of being modulated, according to the present invention.

FIG. 3 shows an optical disc apparatus of a third embodiment of the present invention. More specifically, a beam from a light source 13 of a short wavelength SHG (second harmonics generator) which is capable of being modulated is concentrated through a beam splitter 14 to be applied to an optical disc 15 in the form of a light spot. The reflected light which is modulated by the signal on the optical disc is returned through the beam splitters 14 and 16 to photodetectors 17 and 18 to produce a tracking signal, an autofocusing signal and an information signal. On the other hand, in a recording operation, in the light source 13 which is capable of being modulated, according to the present invention, an ac voltage source 8 is driven by a high frequency signal 20 produced from an information signal 19 to drive a transducer 7. Thus, the light intensity modulation over several hundreds of MHz is carried out with a laser beam modulating signal 21, thereby to record a desired signal on the optical disc 15.

EMBODIMENT 4

Figure 4:
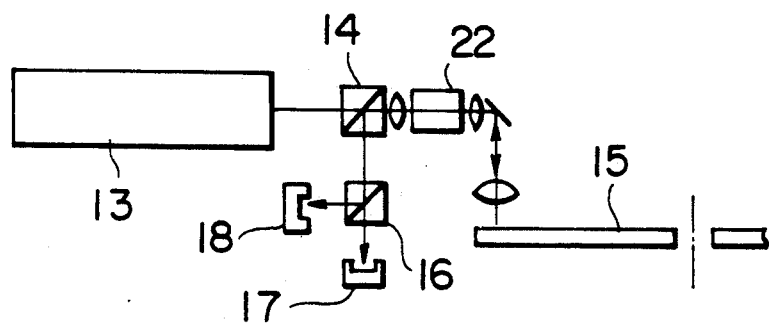
FIG. 4 is a diagram showing the arrangement of an optical disc apparatus in which a light source according to the present invention is combined with an optical deflector in the device.

FIG. 4 shows a fourth embodiment according to the present invention. That is, with the arrangement including the light source 13 and the optical disc 15, an acoustooptic device 22 for tracking is disposed to enable an access operation to be carried out at a very high speed. In such a manner, by combining the short wavelength light source capable of being directly modulated with the acoustooptic device for tracking access, it is possible to construct an optical disc system in which the recording density can be increased and the data transfer rate can be shortened. The elements other than those described above are disposed in the same way as in the third embodiment shown in FIG. 3.

EMBODIMENT 5

Figure 5:
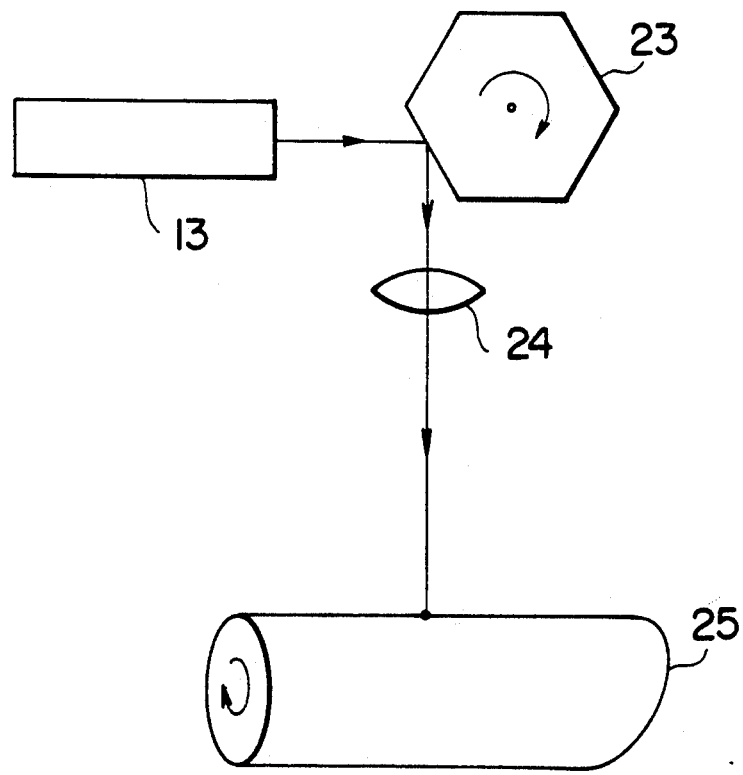
FIG. 5 is a diagram showing the arrangement of a laser printer using a light source according to the present invention.

FIG. 5 shows a fifth embodiment of the present invention. That is, the present embodiment is constructed in such a way that the short wavelength light source 13 capable of being directly modulated according to the present invention is applied to a light source used for a laser beam printer. A beam emitted from the light source 13 is scattered by a rotating polygon mirror 23 to scan an upper surface of a photosensitive drum 25 through an F$\theta$ lens 24. The beam from the light source which is directly modulated with an information signal is applied to the photosensitive drum 25 for printing to be transcribed to a recording sheet. Thus, the printing is carried out at a resolution remarkably higher than that of the prior art.

The method of modulating a laser beam is completely similar to that shown in the third embodiment of FIG. 3.

EMBODIMENT 6

Figure 6:
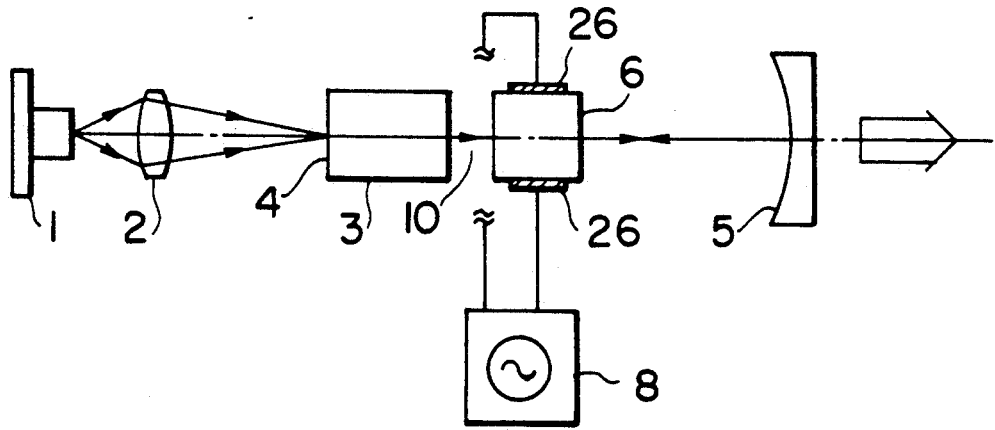
FIG. 6 is a diagram showing the arrangement of still another embodiment of the present invention.

FIG. 6 is a diagram showing still another embodiment according to the present invention. In FIG. 6, those elements in correspondence to their counter elements in FIG. 1 are represented with the same reference numerals and the description thereof is omitted here for brevity. In the present embodiment, for the purpose of modulating the laser beam, a suitable voltage is applied across electrodes 26 of the nonlinear optical crystal 6 to break the phase matching conditions for the generation of the second harmonic, thus preventing the second harmonic from being generated. As a result, the modulation can be carried out by switching the second harmonic on or off.

As set forth hereinabove, according to the present invention, the laser beam modulation which is essential to the system application can be carried out within the short wavelength light source itself. Therefore, there are provided great effects in that the short wavelength light source can be miniaturized to be compact and the cost thereof can be reduced to improve the recording density of the optical disc and to enhance the printing resolution of the laser printer.

We claim:

1. A harmonic light source comprising:
   a laser light source radiating a laser beam;
   a resonator;
   a laser active medium disposed in said resonator, said laser active medium receiving the laser beam from said laser light source and generating a laser oscillation in response to the laser beam;
   a harmonic generating medium disposed in said resonator, said harmonic generating medium receiving the laser oscillation from said laser active medium and generating a harmonic of the laser oscillation in response to the laser oscillation; and
   means for applying an electric field to said harmonic generating medium in response to data to break phase matching conditions in said harmonic generating medium necessary for generating the harmonic, thereby modulating the harmonic in response to the data.

2. A harmonic light source according to claim 1, wherein said means for applying said electric field an electric includes electrodes mounted on said harmonic generating medium, and a power source for applying an ac voltage across said electrodes, thereby applying the electric field to said harmonic generating medium.

3. A harmonic light source according to claim 1, wherein said resonator is formed by an end surface of said laser active medium receiving the laser beam and a reflecting surface reflecting the harmonic.

4. A harmonic light source according to claim 1, wherein said laser active medium is one of Nd:YAG and Nd:YVO, and wherein the harmonic is modulated at a frequency of at least 20 MHz in response to the data.

5. A harmonic light source according to claim 1, wherein said laser active medium is one of Nd:YAG and Nd:YVO, and wherein said harmonic generating medium is a nonlinear optical crystal.

6. A harmonic light source according to claim 1, wherein said harmonic generating medium is a nonlinear optical crystal, and wherein said means for applying applies the electric field to said nonlinear optical crystal in response to the data to break phase matching conditions in said nonlinear optical crystal necessary for generating the harmonic by generating deformation in said nonlinear optical crystal, thereby modulating the harmonic in response to the data by preventing the harmonic from being generated.

7. A harmonic light source according to claim 1, wherein said laser active medium is one of Nd:YAG and Nd:YVO, and wherein the harmonic is modulated at a frequency of at least 1 MHz in response to the data.

8. A harmonic light source according to claim 1, wherein said harmonic generating medium is a nonlinear optical crystal selected from a group consisting of KTP, $KNbO_3$, MNA, and xanthone.

9. An optical information processing apparatus comprising:
   a haromic light source as claimed in claim 1 and
   means for applying the modulated harmonic from said haromic light source in a recording medium, thereby recording the data on said recording medium in response to the modulated harmonic.

10. An optical information processing apparatus according to claim 9, wherein said recording medium is an optical disc.

11. An optical information processing apparatus according to claim 9, wherein said recording medium is a photosensitive drum.

12. A harmonic light source comprising:
    a laser light source radiating a laser beam;
    a resonator;
    a laser active medium disposed in said resonator, said laser active medium receiving the laser beam from said laser light source and generating a laser oscillation in response to the laser beam;
    a harmonic generating medium disposed in said resonator, said harmonic generating medium receiving the laser oscillation from said laser active medium and generating a harmonic of the laser oscillation in response to the laser oscillation; and
    means for applying one of a supersonic wave and an electric field to one of said laser active medium and said harmonic generating medium in response to data, thereby modulating the harmonic in response to the data;
    wherein said laser active medium is one of Nd:YAG and Nd:YVO, and wherein the harmonic is modulated at a frequency of at least 1 MHz in response to the data.

13. A harmonic light source according to claim 12, wherein the harmonic is modulated at a frequency of at least 20 MHz in response to the data.

14. A harmonic light source comprising:
    a laser light source radiating a laser beam;
    a resonator;
    a laser active medium disposed in said resonator, said laser active medium receiving the laser beam from said laser light source and generating a laser oscillation in response to the laser beam;
    a harmonic generating medium disposed in said resonator, said harmonic generating medium receiving the laser oscillation from said laser active medium and generating a harmonic of the laser oscillation in response to the laser oscillation; and means for applying one of a supersonic wave and an electric field to one of said laser active medium and said harmonic generating medium in response to data, thereby modulating the harmonic in response to the data;

wherein said harmonic generating medium is a nonlinear optical crystal selected from a group consisting of KTP, KNbO$_3$, NMA, and xanthone.

15. An optical information recording apparatus comprising:

a laser medium generating a fundamental wave;

a nonlinear optical crystal receiving the fundamental wave from the laser medium and generating a second harmonic of the fundamental wave in response to the fundamental wave;

a transducer generating a supersonic wave in the nonlinear optical crystal in response to data to be recorded, wherein the second harmonic is deflected by the supersonic wave, and wherein the second harmonic is undeflected when the transducer does not generate the supersonic wave in the nonlinear optical crystal;

an aperture stop blocking the deflected second harmonic and passing the undeflected second harmonic; and a recording medium receiving the undeflected second harmonic passed by the aperture stop and recording the data in response to the undeflected second harmonic.

16. An optical information recording apparatus according to claim 15, wherein the data to be recorded in digital data having values of "1" and "0", wherein the transducer generates the supersonic wave in the nonlinear optical crystal when the digital data has one of the values of "1" and "0", and wherein the transducer does not generate the supersonic wave in the nonlinear optical crystal when the digital data has another of the values of "1" and "0".

17. An optical information recording apparatus comprising:

a laser medium generating a fundamental wave;

a transducer generating a supersonic wave in the laser medium in response to data to be recorded, wherein the fundamental wave is deflected by the supersonic wave, and wherein the fundamental wave is undeflected when the transducer does not generate the supersonic wave in the laser medium;

an aperture stop blocking the deflected fundamental wave and passing the undeflected fundamental wave;

a nonlinear optical crystal receiving the undeflected fundamental wave passed by the aperture stop and generating a second harmonic of the fundamental wave in response to the undeflected fundamental wave; and a recording medium receiving the second harmonic from the nonlinear optical crystal and recording the data in response to the second harmonic.

18. An optical information recording apparatus according to claim 12, wherein the data to be recorded is digital data having values of "1" and "0", wherein the transducer generates the supersonic wave in the laser medium when the digital data has one of the values of "1", and "0", and wherein the transducer does not generate the supersonic wave in the laser medium when the digital data has another of the values of "1" and "0".

19. An optical information recording apparatus comprising:

a laser medium generating a fundamental wave;

a nonlinear optical crystal receiving the fundamental wave from the laser medium and generating a second harmonic of the fundamental wave in response to the fundamental wave;

an electrode applying an ac voltage to the nonlinear optical crystal in response to data to be recorded, wherein the nonlinear optical crystal generates the second harmonic when the electrode does not apply the ac voltage to the nonlinear optical crystal, and wherein the nonlinear optical crystal does not generate the second harmonic when the electrode applies the ac voltage to the nonlinear optical crystal; and a recording medium receiving the second harmon from the nonlinear optical crystal and recording the data in response to the second harmonic.

20. An optical information recording apparatus according to claim 19, wherein the data to be recorded is digital data having values of "1" and "0", wherein the electrode does not apply the ac voltage to the nonlinear optical crystal when the digital data has one of the values of "1" and "0", and wherein the electrode applies the ac voltage to the nonlinear optical crystal when the digital data has another of the values of "1" and "0".

21. An optical information recording apparatus comprising:

an Nd:YAB laser medium generating a laser beam;

a transducer generating a supersonic wave in the Nd:YAB laser medium in response to data to be recorded, wherein the laser beam is deflected by the supersonic wave, and wherein the laser beam is undeflected when the transducer does not generate the supersonic wave in the Nd:YAB laser medium;

an aperture stop blocking the deflected laser beam and passing the undeflected laser beam; and a recording medium receiving the undeflected laser beam passed by the aperture stop and recording the data in response to the undeflected laser beam.

22. An optical information recording apparatus according to claim 21, wherein the data to be recorded is digital data having values of "1" and "0", wherein the transducer generates the supersonic wave in the Nd:YAB laser medium when the digital data has one of the values of "1", and "0", and wherein the transducer does not generate the supersonic wave in the Nd:YAB laser medium when the digital data has another of the values of "1" and "0".

* * * * *